(12) United States Patent
Johnson

(10) Patent No.: US 6,513,261 B2
(45) Date of Patent: Feb. 4, 2003

(54) MEASURING AND SCRIBING DEVICE

(76) Inventor: Anthonio Johnson, 1838 N. Shefford Ct., Wichita, KS (US) 67212

( * ) Notice: Subject to any disclaimer, the term of this patent is extended or adjusted under 35 U.S.C. 154(b) by 14 days.

(21) Appl. No.: 09/739,131

(22) Filed: Dec. 18, 2000

(65) Prior Publication Data

US 2002/0073568 A1 Jun. 20, 2002

(51) Int. Cl.[7] .................................................. G01B 3/10
(52) U.S. Cl. ................................ 33/668; 33/42; 33/761
(58) Field of Search .................. 33/668, 755, 758–761, 33/27.01, 27.02, 27.031, 27.032, 42

(56) References Cited

U.S. PATENT DOCUMENTS

| 3,479,742 | A | * | 11/1969 | Starkenberg | ................. 33/761 |
| 4,578,867 | A | * | 4/1986 | Czerwinski et al. | .......... 33/138 |
| 4,630,376 | A | * | 12/1986 | Pentecost | ..................... 33/138 |
| 4,729,171 | A | * | 3/1988 | Samson | ........................ 33/138 |
| 4,794,692 | A | * | 1/1989 | Wang | ........................... 33/760 |
| 4,976,037 | A | | 12/1990 | Hines | |
| 5,134,784 | A | * | 8/1992 | Atienza | ....................... 33/668 |
| 5,206,965 | A | | 5/1993 | Rowley | |
| 5,295,308 | A | | 3/1994 | Stevens et al. | |
| 5,349,760 | A | | 9/1994 | DeVito | |
| 5,379,524 | A | | 1/1995 | Dawson | |
| 5,406,711 | A | * | 4/1995 | Graham | ......................... 33/42 |
| 5,416,978 | A | * | 5/1995 | Kaufman | ..................... 33/770 |
| 5,430,952 | A | | 7/1995 | Betts | |
| 5,542,184 | A | | 8/1996 | Beard | |
| 5,829,152 | A | * | 11/1998 | Potter et al. | ................... 33/668 |
| 6,032,380 | A | * | 3/2000 | Li | ............................... 33/767 |
| 6,070,338 | A | * | 6/2000 | Garity | ........................ 33/760 |
| 6,115,931 | A | * | 9/2000 | Arcand | ........................ 33/668 |

FOREIGN PATENT DOCUMENTS

| GB | 2172109 A | * | 2/1986 | ................... 33/760 |
| SE | 0019744 | * | 8/1905 | ................... 33/760 |
| WO | WO9400951 | * | 5/1994 | ................... 33/760 |

* cited by examiner

Primary Examiner—Diego Gutierrez
Assistant Examiner—Gail Verbitsky
(74) Attorney, Agent, or Firm—Kenneth H. Jack; Davis & Jack, L.L.C.

(57) ABSTRACT

A measuring and scribing device having a "clam shell" housing, having a forward end, a rearward end, an upper end, and having a lower end. Within the housing is mounted a spirally wound alternately forwardly extendable and rearwardly retractable measuring tape. Along the rear wall of the housing is mounted an alternately downwardly extendable and upwardly retractable surface scribing implement. The surface scribing implement is upwardly spring biased to a safe position within the housing. An operative mechanical linkage between a hook end of the measuring tape and a latch for holding the scribing implement in an extended position, allows release of the latch upon retraction of the tape, automatically retracting the surface scribing implement upon retraction of the tape.

8 Claims, 8 Drawing Sheets

MEASURING AND SCRIBING DEVICE

FIELD OF THE INVENTION

This invention relates to tape measurers and surface scribing implements. More particularly, this invention relates to tape measurers, including adaptations allowing them to simultaneously perform a surface scribing function.

BACKGROUND OF THE INVENTION

Carpenters who work with sheet materials such as plywood, gypsum board, or wafer board, commonly utilize a spring recoil tape measurer for accurately locating cut lines. Once the location of a cut line is accurately identified, the carpenter will typically mark the desired point by scribing the material with a blade of a knife, with a pointed stylus such as a nail or awl, with a graphite pencil, a paraffin pencil, a felt tip marker, a ballpoint pen, a charcoal marker, or with a chalk marker. Often, both of a carpenter's hands are occupied in holding the tape measurer and scribing device. However, it is often desirable for the carpenter to simultaneously utilize one of his or her hands to securely hold the sheet material which is being measured and marked. Where both of a carpenter's hands are occupied with holding a tape measurer and a scribing device, a carpenter is unable to simultaneously hold the sheet material.

The instant inventive device solves the above problem by extendably and retractably mounting a scribing device within the housing of a tape measurer, by providing automatic retracting means for purposes of safety.

BRIEF SUMMARY OF THE INVENTION

The instant inventive measuring and scribing device incorporated much of the structure common to conventional spring recoil tape measurers. According to the structure of the instant invention, the lower, upper, and side walls of such common tape measurer extend rearwardly beyond its rear wall, the rearward extensions of such walls forming a chamber of sufficient depth for housing a surface scribing implement. Within such rear chamber, a carriage is slidably mounted for alternate upward and downward sliding motion. Such carriage is preferably adapted to securely receive and retain a surface scribing implement such as a blade, a pointed stylus, a pencil, or a pen. The floor of such rearward chamber is apertured, allowing downward extension therethrough of a lower end of such surface scribing implement, and alternately allowing upward retracting therethrough. Preferably, a spring biases both the carriage and the surface scribing implement in a normally retracted position, and a manually actuatable latch is provided for selectively retaining such implement in its downwardly extended position.

For purposes of safety, means are provided to assure that upon retraction of the tape measurer, the surface scribing implement will automatically retract, preventing a user from becoming cut or injured. Preferably, such means comprises a slidable trip bar which protrudes forwardly from the housing beneath the tape, for actuation by a hook end mounted upon the distal end of the tape. Rearwardly directed pressure applied by the rearwardly facing surface of the hook end upon the forward end of such trip bar drives the trip bar rearwardly, causing a rearward end of such bar to disengage the latch, and allowing the spring to retract the carriage and the surface scribing implement.

Accordingly, it is an object of the present invention to provide a tape measurer having mounted thereon an alternately extendable and retractable surface scribing implement. It is a further object of the present invention to provide such a device incorporating automatic surface scribing implement retracting means, assuring that upon retraction of the tape, the surface scribing implement will retract.

Other and further objects, benefits, and advantages of the present invention will become known to those skilled in the art upon review of the Detailed Description which follows, and upon review of the appended drawings.

DETAILED DESCRIPTIONS OF EXEMPLARY PREFERRED EMBODIMENTS

Figure 1:
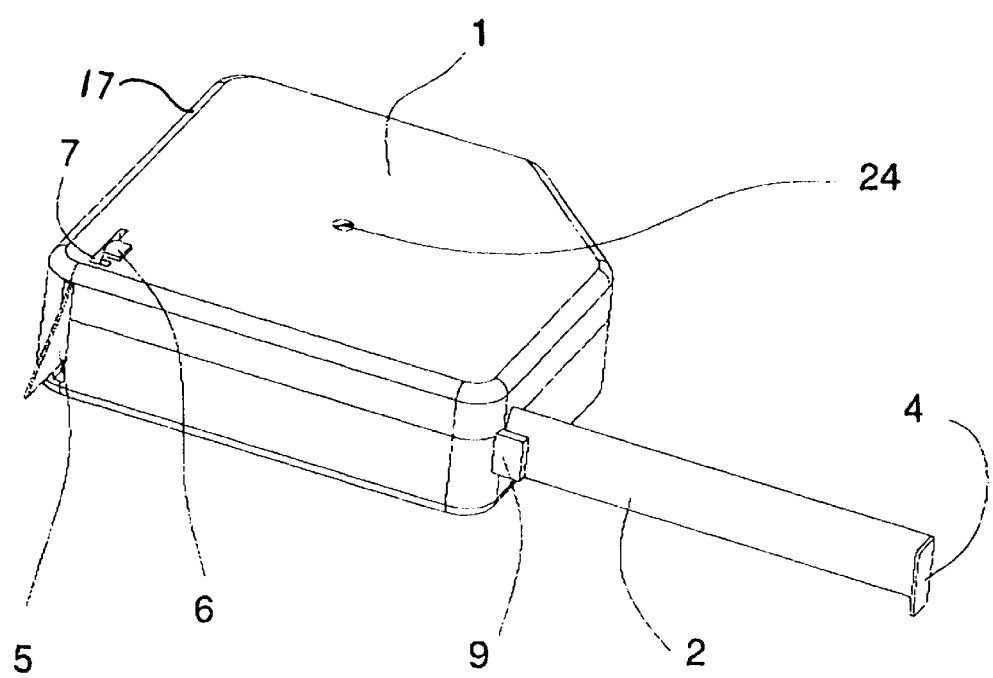
FIG. 1 is an isometric view of a preferred embodiment of the instant inventive measuring and scribing device.
Figure 2:
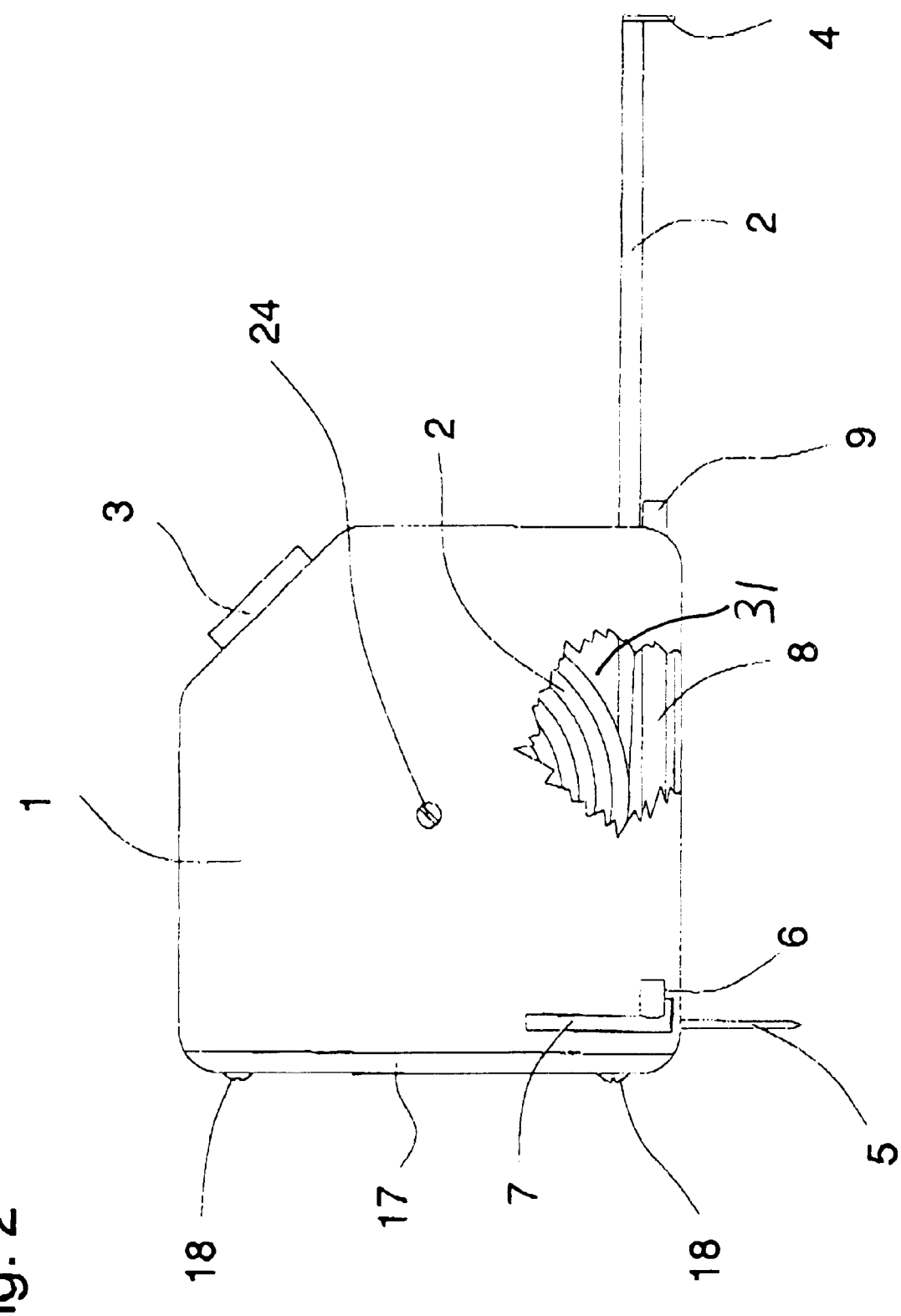
FIG. 2 is a side view of the implement depicted in FIG. 1, such view having a cut away section for viewing underlying structure.

Referring now to the drawings, and in particular to FIG. 1, a major structural element of the instant inventive measuring and scribing device is a housing 1, preferably having left and right "clam shell" halves which are closely fitted to each other, and which are held together by screw 24. Referring simultaneously to FIGS. 1 and 2, the "clam shell" halves of the housing 1 together define and enclose a forward tape containing chamber 31, such chamber encasing a preferably spirally wound measuring tape 2. A recoil spring (not depicted) is preferably conventionally mounted within the forward tape containing chamber 31, such spring being mounted axially for rewinding and retracting tape 2. A distal or forward end of the measuring tape 2 protrudes forwardly through a tape extension aperture within the forward wall of housing 1, allowing the tape 2 to be manually forwardly extended for use, and alternately to be rearwardly retracted and rewound when not in use.

The distal or forward end of tape 2 preferably has a hook end 4 fixedly attached thereto, the downwardly extending and rearwardly facing surface of the hook end being conventionally useable for engaging an edge of an object to be measured or scribed by the device. Referring to FIG. 2, the inventive device preferably incorporates a tape lock button 3 which is, in conventional fashion, slidably moveable forwardly and downwardly to lock tape 2 in a selected extended position, and which is alternately slidably moveable upwardly and rearwardly, releasing tape 2 for spring recoil.

Figure 3:
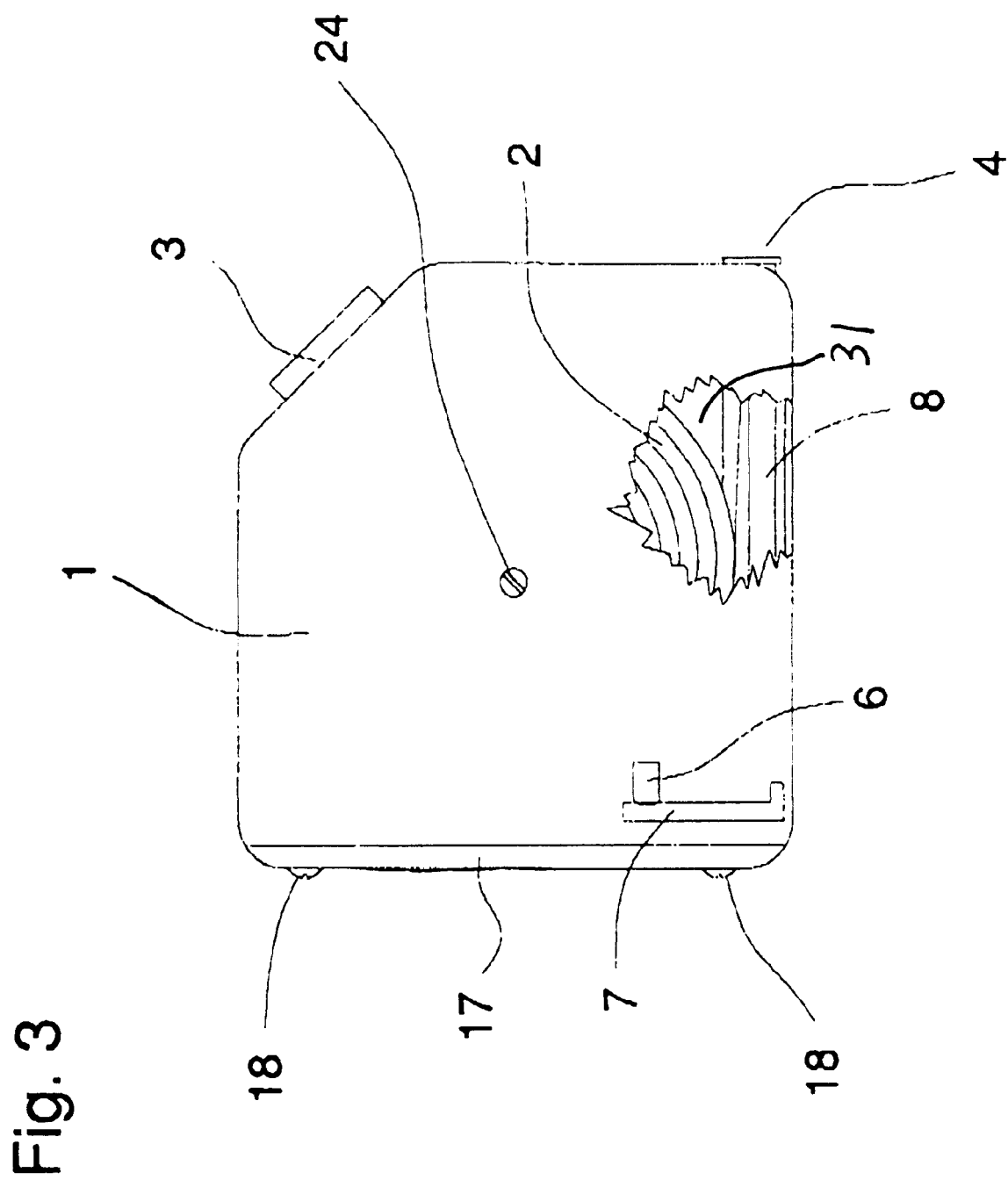
FIG. 3 redepicts FIG. 2 showing scribing implement and tape in their retracted positions.

In operation of the inventive device, referring simultaneously to FIGS. 2 and 3, a manual pulling force is applied to hook end 4, causing tape 2 to forwardly extend from a retracted position, as depicted in FIG. 3, to a selected extended position, as depicted in FIG. 2. Upon reaching the selected extended position, tape lock button 3 may be manually pressed forwardly and downwardly, locking tape 2 in place. Upon extension of tape 2, scribing implement extension button 6 may be manually moved slidably downwardly to the lower end of "L" slot 7, and thence forwardly therealong, latching button 6 in place. Such slidable motion of button 6 results in downward extension of a surface scribing implement such as blade 5.

With blade 5 and tape 2 locked in place as depicted in FIG. 2, the inventive device may be simultaneously utilized for measuring and scribing an object such as a sheet of gypsum board.

Referring further simultaneously to FIGS. 2 and 3, after measuring and scribing operations are completed, tape lock button 3 may be manually slidably moved upwardly and rearwardly allowing the recoil spring (not depicted) within the forward tape containing chamber 31 of housing 1 to retract tape 2.

Upon complete retraction of tape 2, the rearwardly facing and downwardly extending surface of hook end 4 strikes a forward end 9 of a latch disengaging member, such member preferably being configured as a slide bar 8. The striking force applied by hook end 4 to bar end 9 drives the slide bar 8 rearwardly within housing 2. Upon such rearward motion of slide bar 8, scribing implement extension button 6 slides rearwardly along "L" slot 7, allowing automatic retraction of blade 5.

Figure 4:
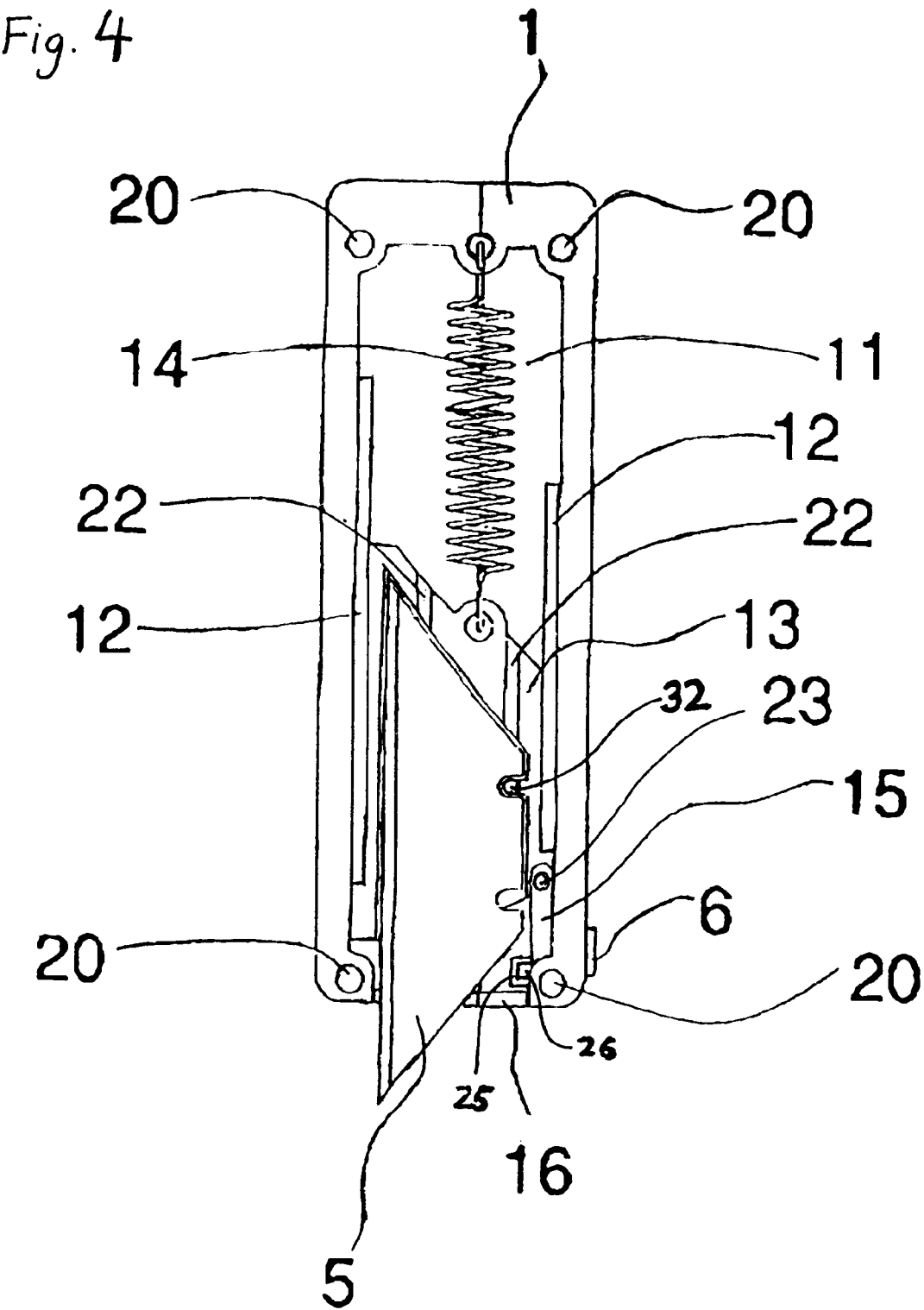
FIG. 4 is a rear view of the implement depicted in FIG. 1, with cover plate removed.

Referring to FIG. 4, the left, right, upper, and lower walls of housing 1 preferably extend rearwardly beyond the rearwardly facing surface of rear wall 11 forming a rearwardly opening chamber for containing the surface scribing implement (e.g. blade 5), such implement preferably being mounted upon and carried by a slidably mounted carriage 13. Forward motion of the carriage 13 is restricted by the rearwardly facing surface of rear wall 11, along which carriage 13 is free to alternately slidably move upwardly and downwardly. Leftward and rightward motion of the carriage 13 is restricted by the rearwardly extending left and right walls of housing 1. Rearward motion of the carriage 13 is preferably restricted by slide ridges 12 which extend inwardly from the left and right walls of the housing to overlie the rearwardly facing surface of the carriage 13, at such carriage's left and right edges.

Figure 5:
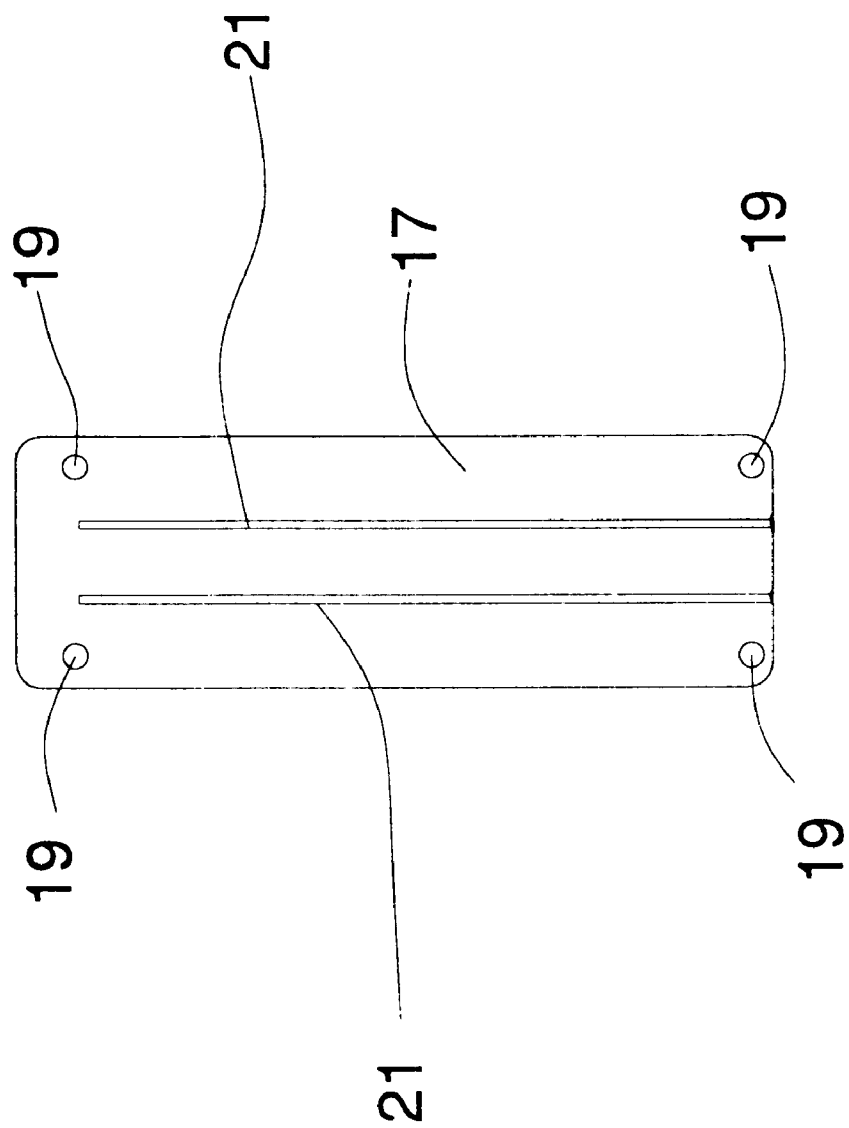
FIG. 5 is a plan view of the cover plate.

Referring further to FIG. 4, the rearwardly facing surface of carriage 13 preferably has a recess closely fitted for receiving blade 5, the recess including a fitted blade notch lug 32. Through such close fitting, the recess restricts forward, upward, downward, leftward, and rightward motions of blade 5 with respect to carriage 13. Referring simultaneously to FIGS. 4 and 5, the rearwardly facing (upon installation) surface of cover plate 17 has a pair of parallel blade retaining ridges 21, such ridges 21 being closely fitted and oriented to extend nestably into channels 22 while remaining in slidable contact with the rearwardly facing surface of blade 5.

Referring again to FIG. 1, a rarefaction spring 14 spans between and interconnects eyes 33 and 34, such spring upwardly biasing and slidably moving the carriage 13 and blade 5 to a normally retracted position.

Referring simultaneously to FIGS. 2 and 4, a lower end of the carriage 13 is preferably interconnected with the scribing implement extension button 6 by spring steel shaft 15, the upper end of said shaft being fixedly attached to the lower end of carriage 13 by rivet 23. Referring simultaneously to FIGS. 3 and 4, manual downwardly directed pressure applied to scribing implement extension button 6 pulls spring steel shaft 15 downwardly, and pulls downwardly carriage 13 against spring 14; such downward motion extending the lower end of blade 5 downwardly through slot 16. Upon full downward extension, button 6 may be manually thrusted forwardly allowing the button 6 in combination with shaft 15 and the lower end of slot 7 to serve as a latch.

Referring simultaneously to FIGS. 2 and 4, rearward sliding motion of slide bar 8 (induced by striking contact with hook end 4) extends such bar's rearward end 26 rearwardly through an aperture 25 within rear wall 11, allowing said end 26 to contact the forwardly facing surface of spring steel shaft 15. Such contact drives the lower end of such shaft rearwardly, disengaging button 6 with the lower end of "L" slot 7. Upon such disengagement, spring 14 upwardly retracts carriage 13 and blade 5, safely and securing storing such blade entirely within the scribing implement containing chamber of the housing 1.

Referring simultaneously to FIGS. 2, 4, and 5, cover plate 17 is preferably removably attached to the rear of housing 1 by spirally threaded screws 18 extending through smooth walled screw receiving apertures 19 for secure mounting within spirally threaded screw receiving apertures 20.

Referring simultaneously to FIGS. 3 and 4, while the mechanical linkage comprising eye 34, spring 14, eye 33, carriage 13, rivet 23, spring steel shaft 15, bar 8, and hook end 4 is a preferred automatic surface scribing implement retracting means, numerous other mechanical linkage means for automatically retracting the surface scribing implement upon retraction of the tape may be suitably utilized. For example, differently configured springs, or elastic bands may be substituted for spring 14. As a further example, numerous other latching configurations may be suitably adopted. Means other than a slide bar for transferring the striking force of the hook end, such as a pivot arm may be suitably utilized.

Figure 6:
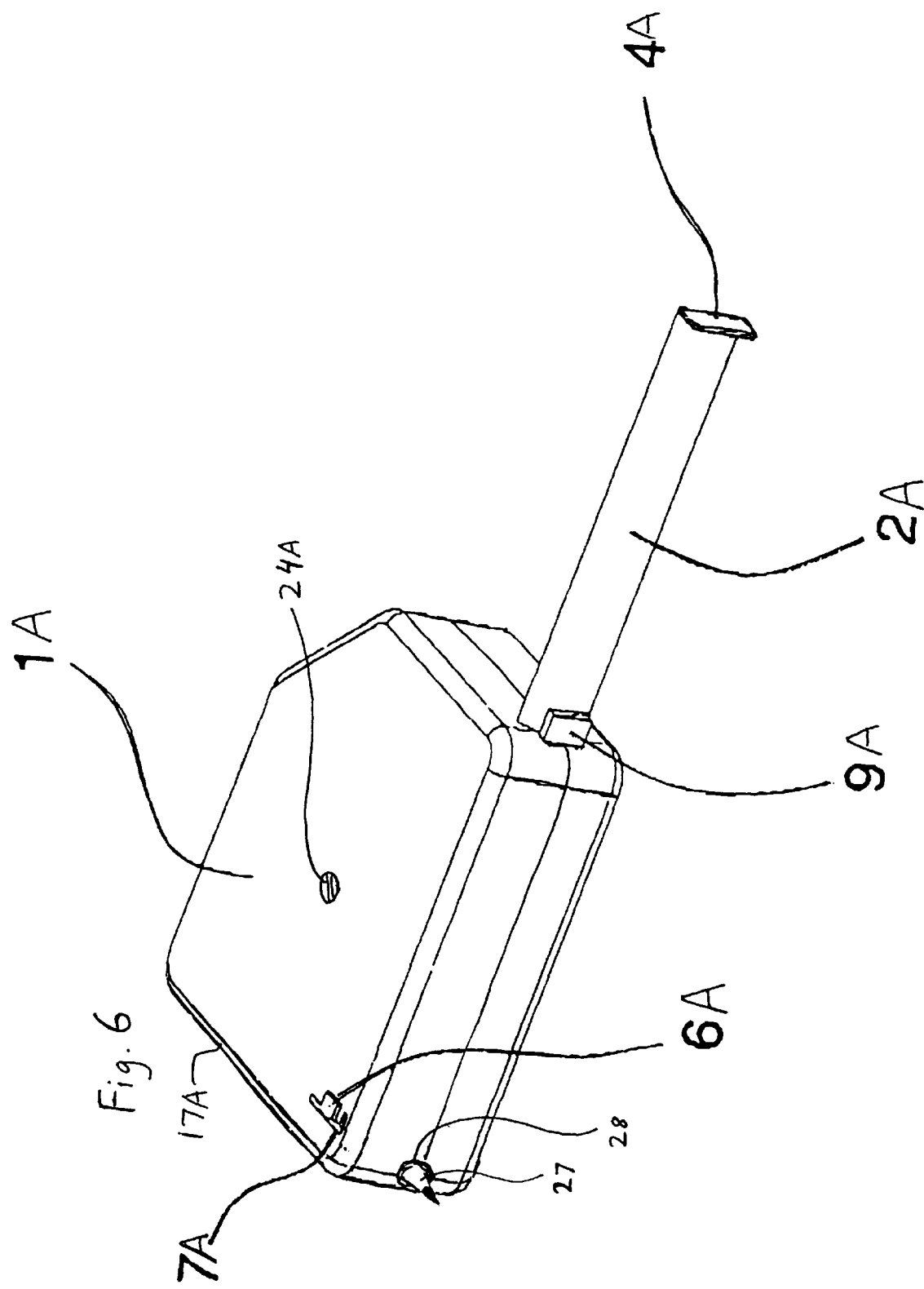
FIG. 6 is an isometric view of an alternate configuration of the instant inventive measuring and scribing device.
Figure 7:
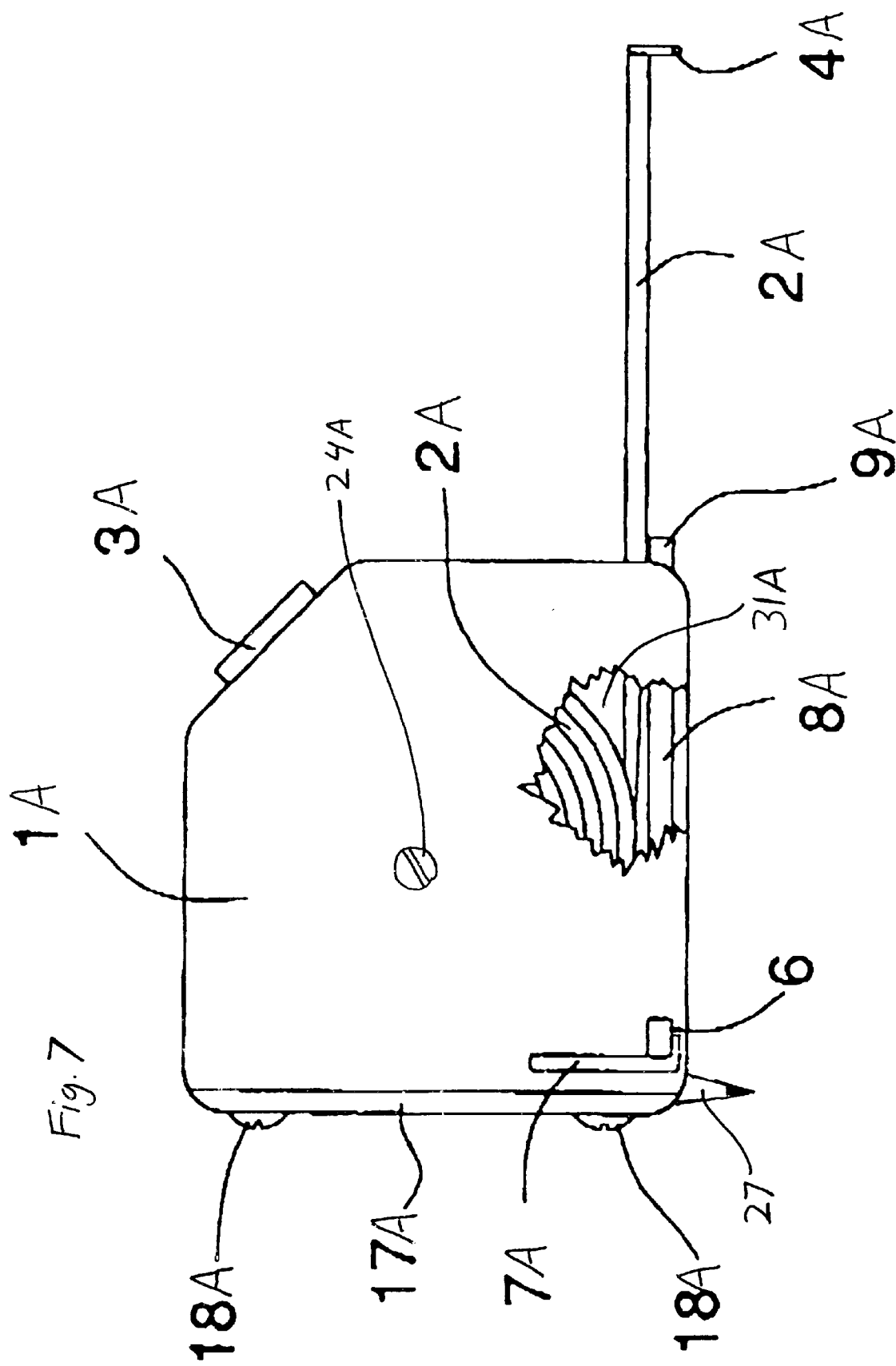
FIG. 7 is a side view of the device depicted in FIG. 6, having a cut away section for viewing underlying structure.
Figure 8:
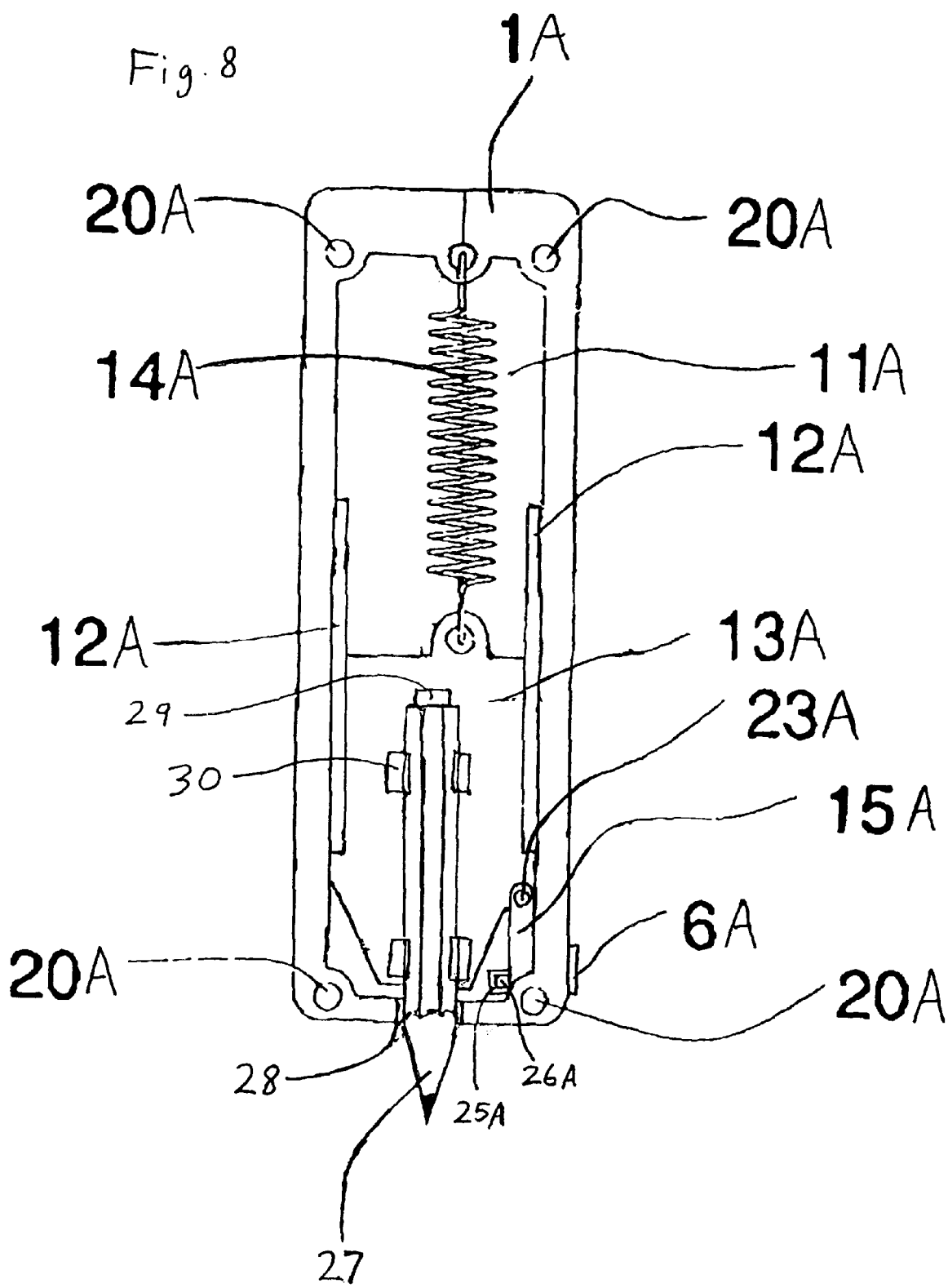
FIG. 8 is a rear view of the device depicted in FIG. 6, with cover plate removed.

Referring to FIGS. 6, 7, and 8, each reference numeral having a suffix "A" is substantially identical to similarly numbered structural elements appearing in FIGS. 1–5. Referring to FIG. 8, rather than configuring the surface scribing implement as a blade, the surface scribing implement is redepicted as a graphite core pencil 27, such pencil being removably mounted upon and securely positioned upon carriage 13A by clips 30 and by slide stop 29, the clips 30 and slide stop 29 being fixedly attached to and extending rearwardly from the rearwardly facing surface of carriage 13A. Referring simultaneously to FIGS. 6 and 8, upon downward sliding motion of surface scribing implement extension button 6A, the point of pencil 27 extends downwardly through aperture 28. Automatic retraction of pencil 27 upon retraction of blade 2A occurs in a fashion similar to that described above in reference to FIGS. 1–5.

Referring to FIG. 8, pencil 27 is exemplary of other suitable surface scribing implements such as pointed styluses (e.g., nails and awls), ballpoint pens, felt tipped markers, fountain pens, paraffin core pencils, chalk markers, and charcoal markers.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A measuring and scribing device comprising:
   (a) a housing having a forward end, a rearward end, an upper end, and a lower end;
   (b) an alternately forwardly extendable and rearwardly retractable measuring tape mounted within the housing;
   (c) an alternately downwardly extendable and upwardly retractable surface scribing implement mounted within the housing; and,
   (d) surface scribing implement retracting means adapted for automatically retracting the surface scribing implement upon retraction of the measuring tape, the surface scribing implement comprising an article selected from the group consisting of blades, pointed styluses, graphite core pencils, paraffin core pencils, felt tipped markers, ballpoint pens, fountain pens, chalk markers, and charcoal markers; the automatic surface scribing implement retracting means comprising a spring or elastic band having an end operatively connected to the surface scribing implement, and having an opposite end operatively connected to the housing, the automatic surface scribing implement retracting means comprising a latch adapted for, upon downward extension of the surface scribing implement, resisting upward retraction of the surface scribing implement, the measuring tape having a distal end extending forwardly from the housing, and comprising an end hook fixedly attached to the distal end, the automatic surface scribing implement retracting means comprising a latch disengaging member slidably mounted within the housing, the latch disengaging member having a forward end and a rearward end, the forward end of the latch disengaging member being positioned for contact with the end hook upon rearward retraction of the measuring tape, the rearward end of the latch disengaging member being positioned for contacting the latch upon rearward sliding motion of the latch disengaging member.

2. A measuring and scribing device comprising:
   (a) a housing having a forward end, a rearward end, an upper end, and a lower end;
   (b) an alternately forwardly extendable and rearwardly retractable measuring tape mounted within the housing;
   (c) an alternately downwardly extendable and upwardly retractable surface scribing implement mounted within the housing; and,
   (d) surface scribing implement retracting means adapted for automatically retracting the surface scribing implement upon retraction of the measuring tape, the surface scribing implement comprising an article selected from the group consisting of blades, pointed styluses, graphite core pencils, paraffin core pencils, felt tipped markers, ballpoint pens, fountain pens, chalk markers, and charcoal markers; the automatic surface scribing implement retracting means comprising a spring or elastic band having an end operatively connected to the surface scribing implement, and having an opposite end operatively connected to the housing, the operative connection of the spring or elastic band to the surface scribing implement comprising a carriage, the surface scribing implement being mounted upon the carriage, the carriage being slidably mounted within the housing for alternate upward and downward sliding motion, the automatic surface scribing implement retracting means comprising a latch adapted for, upon downward sliding motion of the carriage, resisting upward sliding motion of the carriage, and resisting upward retraction of the surface scribing implement, the measuring tape being spirally wound, the measuring tape having a distal end extending forwardly from the housing, and further comprising an end hook fixedly attached to the distal end, the automatic surface scribing implement retracting means comprising a latch disengaging member slidably mounted within the housing, the latch disengaging member having a forward end and a rearward end, the forward end of the latch disengaging member being positioned for contact with the end hook upon rearward retraction of the measuring tape, the rearward end of the latch disengaging member being positioned for contacting the latch upon rearward sliding motion of the latch disengaging member.

3. A measuring and scribing device comprising:
   (a) a housing having a forward end, a rearward end, an upper end, and a lower end;
   (b) an alternately forwardly extendable and rearwardly retractable measuring tape mounted within the housing;
   (c) an alternately downwardly extendable and upwardly retractable surface scribing implement mounted within the housing; and,
   (d) surface scribing implement retracting means adapted for automatically retracting the surface scribing implement upon retraction of the measuring tape, the surface scribing implement comprising an article selected from the group of blades, pointed styluses, graphite core pencils, paraffin core pencils, felt tipped markers, ballpoint pens, fountain pens, chalk markers, and charcoal markers; the automatic surface scribing implement retracting means comprising a spring or elastic band having an end operatively connected to the surface scribing implement, and having an opposite end operatively connected to the housing, the housing having a forward tape containing chamber and a rearward surface scribing implement containing chamber, the forward tape containing chamber having left and right sides respectively defined by left and right "clam shell" halves, the rearward surface scribing implement containing chamber opening rearwardly, the rearward opening of the surface scribing implement containing chamber being covered by a removable cover plate, the automatic surface scribing implement retracting means comprising a spring or elastic band mounted within the surface scribing implement containing chamber, the spring or plastic band having an end operatively connected to the surface scribing implement, and having an opposite end operatively connected to the housing, the automatic surface scribing implement retracting means comprising a latch adapted for, upon downward extension of the surface scribing implement, resisting upward retraction of the surface scribing implement, the measuring tape being spirally wound, the measuring tape having a distal end extending forwardly from the housing, and comprising an end hook fixedly attached to the distal end, the automatic surface scribing implement retracting means comprising a latch disengaging member slidably mounted within the forward tape containing chamber of the housing, the latch disengaging member having a forward end and a rearward end, the forward end of the latch disengaging member extending through an aperture within the forward end of the housing and being positioned for contact with the end hook upon rearward retraction of the measuring tape, the rearward end of the latch disengaging member being positioned for contacting the latch upon rearward sliding motion of the latch disengaging member.

4. The measuring and scribing device of claim 3 wherein the operative connection of the spring or elastic band to the surface scribing implement comprises a carriage, the surface scribing implement being mounted upon the carriage, the carriage being slidably mounted within the rearward surface scribing implement containing chamber of the housing for alternate upward and downward sliding motion.

5. A measuring and scribing device comprising:
  (a) a housing having a forward end, a rearward end, an upper end, and a lower end;
  (b) an alternately forwardly extendable and rearwardly retractable measuring tape mounted within the housing;
  (c) an alternately downwardly extendable and upwardly retractable surface scribing implement mounted within the housing; and,
  (d) automatic surface scribing implement retracting means adapted for retracting the surface scribing implement upon retraction of the measuring tape; the surface scribing implement comprising an article selected from the group of blades, pointed styluses, graphite core pencils, paraffin core pencils, felt tipped markers, ballpoint pens, fountain pens, chalk markers, and charcoal markers; and wherein the automatic surface scribing implement retracting means comprises a spring or elastic band having an end operatively connected to the surface scribing implement, and having an opposite end operatively connected to the housing; the automatic surface scribing implement retracting means further comprising a latch adapted for, upon downward extension of the surface scribing implement, resisting upward retraction of the surface scribing implement; the measuring tape having a distal end extending forwardly from the housing, and further comprising an end hook fixedly attached to the distal end; the automatic surface scribing implement retracting means further comprising a latch disengaging member slidably mounted within the housing, the latch disengaging member having a forward end and a rearward end, the forward end of the latch disengaging member being positioned for contact with the end hook upon rearward retraction of the measuring tape, the rearward end of the latch disengaging member being positioned for contacting the latch upon rearward sliding motion of the latch disengaging member.

6. A measuring and scribing device comprising:
  (a) a housing having a forward end, a rearward end, an upper end, and a lower end;
  (b) an alternately forwardly extendable and rearwardly retractable measuring tape mounted within the housing;
  (c) an alternately downwardly extendable and upwardly retractable surface scribing implement mounted within the housing; and,
  (d) automatic surface scribing implement retracting means adapted for retracting the surface scribing implement upon retraction of the measuring tape; the surface scribing implement comprising an article selected from the group of blades, pointed styluses, graphite core pencils, paraffin core pencils, felt tipped markers, ballpoint pens, fountain pens, chalk markers, and charcoal markers; and wherein the automatic surface scribing implement retracting means comprises a spring or elastic band having an end operatively connected to the surface scribing implement, and having an opposite end operatively connected to the housing; the operative connection of the spring or elastic band to the surface scribing implement comprising a carriage, the surface scribing implement being mounted upon the carriage, the carriage being slidably mounted within the housing for alternate upward and downward sliding motion; the automatic surface scribing implement retracting means further comprising a latch adapted for, upon downward sliding motion of the carriage, resisting upward sliding motion of the carriage, and resisting upward retraction of the surface scribing implement; the measuring tape being spirally wound, and having a distal end extending forwardly from the housing, and further comprising an end hook fixedly attached to the distal end; the automatic surface scribing implement retracting means further comprising a latch disengaging member slidably mounted within the housing, the latch disengaging member having a forward end and a rearward end, the forward end of the latch disengaging member being positioned for contact with the end hook upon rearward retraction of the measuring tape, the rearward end of the latch disengaging member being positioned for contacting the latch upon rearward sliding motion of the latch disengaging member.

7. A measuring and scribing device comprising:
  (a) a housing having a forward end, a rearward end, an upper end, and a lower end;
  (b) an alternately forwardly extendable and rearwardly retractable measuring tape mounted within the housing;
  (c) an alternately downwardly extendable and upwardly retractable surface scribing implement mounted within the housing; and,
  (d) automatic surface scribing implement retracting means adapted for retracting the surface scribing implement upon retraction of the measuring tape; the surface scribing implement comprising an article selected from the group of blades, pointed styluses, graphite core pencils, paraffin core pencils, felt tipped markers, ballpoint pens, fountain pens, chalk markers, and charcoal markers; and wherein the automatic surface scribing implement retracting means comprises a spring or elastic band having an end operatively connected to the surface scribing implement, and having an opposite end operatively connected to the housing; the housing having a forward tape containing chamber and a rearward surface scribing implement containing chamber; the forward tape containing chamber having left and right sides respectively defined by left and right "clam shell" halves; the rearward surface scribing implement containing chamber opening rearwardly, the rearward opening of the surface scribing implement containing chamber being covered by a removable cover plate; the automatic surface scribing implement retracting means comprising a spring or elastic band mounted within the surface scribing implement containing chamber, the spring or plastic band having an end operatively connected to the surface scribing implement, and having an opposite end operatively connected to the housing; the automatic surface scribing implement retracting means further comprising a latch adapted for, upon downward extension of the surface scribing implement, resisting upward retraction of the surface scribing implement; the measuring tape being spirally wound, and having a distal end extending forwardly from the housing, and further comprising an end hook fixedly attached to the distal end; the automatic surface scribing implement retracting means further comprising a latch disengaging member slidably mounted within the forward tape containing chamber of the housing, the latch disengaging member having a forward end and a rearward end, the forward end of the latch disengaging member extending through an aperture within the forward end of the housing and being positioned for contact with the end hook upon rearward retraction of the measuring tape, the rearward end of the latch disengaging member being positioned for contacting the latch upon rearward sliding motion of the latch disengaging member.

8. The measuring and scribing device of claim 7 wherein the operative connection of the spring or elastic band to the surface scribing implement comprises a carriage, the surface scribing implement being mounted upon the carriage, the carriage being slidably mounted within the rearward surface scribing implement containing chamber of the housing for alternate upward and downward sliding motion.

* * * * *